(12) United States Patent
Baugh

(10) Patent No.: US 11,407,015 B1
(45) Date of Patent: Aug. 9, 2022

(54) METHOD OF USING PIPELINE FLOW FOR PIPELINE CLEANING

(71) Applicant: Benton Frederick Baugh, Houston, TX (US)

(72) Inventor: Benton Frederick Baugh, Houston, TX (US)

( * ) Notice: Subject to any disclaimer, the term of this patent is extended or adjusted under 35 U.S.C. 154(b) by 0 days.

(21) Appl. No.: 17/315,288

(22) Filed: May 8, 2021

(51) Int. Cl.
*B08B 9/055* (2006.01)

(52) U.S. Cl.
CPC .......... *B08B 9/0558* (2013.01); *B08B 9/0553* (2013.01)

(58) Field of Classification Search
CPC .............................. B08B 9/0535; B08B 9/053
See application file for complete search history.

(56) References Cited

U.S. PATENT DOCUMENTS

| | | | |
|---|---|---|---|
| 5,875,803 A * | 3/1999 | Leitko | B08B 9/0553 134/167 C |
| 6,122,791 A | 9/2000 | Baugh | |
| 6,374,838 B1 | 4/2002 | Baugh | |
| 6,527,869 B1 | 3/2003 | Bourg | |
| 6,561,280 B1 | 5/2003 | Baugh | |
| 6,651,744 B1 | 11/2003 | Crawford | |
| 7,927,426 B2 | 4/2011 | Baugh | |
| 7,998,276 B1 | 8/2011 | Baugh | |
| 8,931,558 B1 | 1/2015 | Harper | |
| 10,669,138 B2 | 6/2020 | Baugh | |
| 2004/0194809 A1 * | 10/2004 | Crawford | B08B 9/0557 134/22.12 |
| 2012/0097192 A1 * | 4/2012 | Crawford | B08B 9/0557 134/22.12 |
| 2014/0283876 A1 * | 9/2014 | Fjerdingstad | B08B 9/0553 134/8 |

* cited by examiner

*Primary Examiner* — Mikhail Kornakov
*Assistant Examiner* — Ryan L Coleman

(57) ABSTRACT

The method of using the flow within a pipeline to clean the inner wall of the pipeline including placing the cleaning pig into the pipeline to be cleaned at a first location, using a restraining rope or cable to cause the cleaning pig to move along the pipeline at a speed slower than the speed of the flow within the pipeline and thereby causing a pressure differential between the upstream side and the downstream side of the cleaning pig, providing one or more jetting nozzles and using the pressure differential to jet a portion of the flow within the pipeline through the one or more jetting nozzles onto the inner wall of the pipeline while providing a flow area through the cleaning pig to bypass the portion of the flow which does not pass through the one or more jetting nozzles.

19 Claims, 3 Drawing Sheets

METHOD OF USING PIPELINE FLOW FOR PIPELINE CLEANING

TECHNICAL FIELD

This invention relates to the method of cleaning a pipeline by using the existing flow with the pipeline against a cleaning pig which is restrained by a line to provide a jetting differential across the cleaning pig and in this way to use a portion of the existing flow of the pipeline to clean the pipeline and the ability to bring the cleaning pig back to the entrance location for removal.

BACKGROUND OF THE INVENTION

The field of this invention is that of tools and methods used for the cleaning of pipelines, especially the long, extended reach pipelines in offshore areas. As hot production crude is produced from the reservoirs below the ocean floor up to the wellhead equipment at the ocean floor and then through pipelines along the ocean floor, it is cooled by the relatively cool temperature of the ocean water. In deep water, the ocean temperature can be a cold as 34 degrees Fahrenheit.

A characteristic common to a majority of the oil produced is that there is a paraffin component to the oil which will deposit on the walls of the pipeline and become a solid at temperatures well above the 34 degrees Fahrenheit. In fact, some of the paraffins become solid at temperatures above 100 degrees Fahrenheit, and so can be deposited or plated on the internal diameters of the pipelines at any expected ambient temperature. The process is similar to discussions of blocking of the arteries of a human being, with a thicker coating building up with time. Some of the pipelines have become so plugged that more than 90% of the flow area is blocked with waxes or paraffins.

Typically, the wall becomes layered with paraffin as the temperature of the oil goes below the solidification temperature of the particular paraffins in the produced fluids. The paraffins act as a sort of insulation to the flowing fluids in the pipeline, allowing them to maintain a higher temperature for a greater distance. The effect of this is to extend the distance along the pipeline which the paraffin is plating onto the internal diameter of the pipeline.

A common cure for the paraffin plating out on the internal diameter of the pipeline is to insert a pig into the flow stream and let the pig remove some of the paraffin. A pig is typically a cylindrical or spherical tool which will brush against the internal diameter of the pipeline in hopes of removing the deposited paraffins. In pipelines with a high incidence of deposited paraffins, a regular maintenance of pigs is normally prescribed as a preventative against pipeline blockages.

One problem with the pigs is that the deposited paraffins are relatively soft and contain a lot of oil. To some extent, the pigs actually compress the paraffins against the wall and squeeze the oil out, leaving a harder and stronger paraffin remaining.

A second problem is that when the paraffin layer on the internal diameter of the pipe is too thick, sloughing off may occur. If the paraffin starts to separate from the wall and continues, the pig begins to literally plow a block of paraffin ahead of itself. It will continue driving more and more paraffin off the wall of the pipeline until the pressure of the pipeline will no longer be able to move the mass. At that time you have a full pipeline blockage, which frequently cannot be moved by pressure from either end.

At that time the plug of paraffin must be removed by chemicals. Characteristically, the way chemicals are deployed to the location of the blockage is to use a string of coiled pipe or coiled tubing which is unreeled into the pipeline to provide a circulation path for the circulation of chemicals. As the end of the coiled pipe reaches the location of the blockage, the chemicals are circulated either out the coiled tubing and back through the annulus outside of the coiled tubing and inside the pipeline, or the flow will be in the opposite direction.

Before pipelines are completely blocked, wire rope pigs such as are described in U.S. Pat. No. 7,998,276 offer and improved means for removing the paraffins plated onto the inner walls of the pipelines by restraining the movement of the pig with a wire rope and allowing a differential to be built up across the pig to provide a jetting pressure. The jetting pressure can compliment or substitute for the chemicals for improved cleaning. Using this method, the production is stopped in an operational pipeline and pumps are brought in to provide flow and pressure for remediation.

All of the methods described have required the stopping of the revenue producing production and allow pumps to take over the control process. In addition to the loss of production, the pumps are expensive to rent and expensive to mobilize to the jobsite, especially when offshore. It has long been desired to have an effective cleaning system which does not require high volumes of expensive chemicals or shutting down the production flow.

BRIEF SUMMARY OF THE INVENTION

The object of this invention is to provide a method of jet cleaning pipeline using the flow which exists in the pipelines.

A second object of this invention is to return the cleaning pig to the entrance point into the pipeline to eliminate the need for access to and penetrations into the pipeline at two different locations.

A third object of this invention is to not only clean the pipeline on the trip out into the pipeline, but also to reclean the pipeline on the trip back to the starting location.

Another object of this invention is to provide a method of cleaning pipelines without the need of expensive chemicals.

Another object of this invention is to provide a method of cleaning pipelines without needing special pumps.

Another object of this invention is to provide a transportation means for pipeline inspection tools.

DETAILED DESCRIPTION OF THE INVENTION

Figure 1:
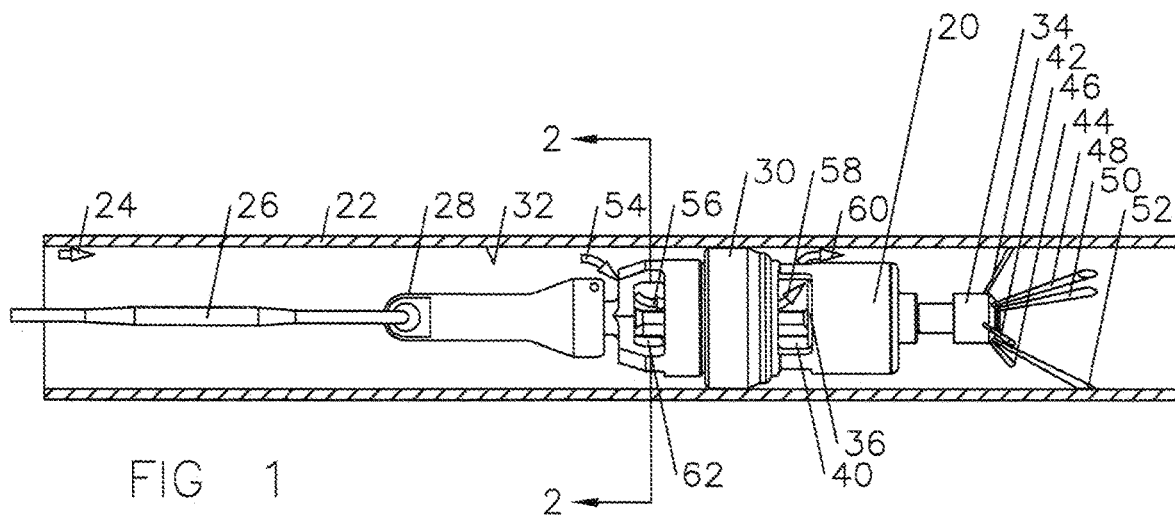
FIG. 1 is a view of a cleaning pig travelling in a pipeline and both cleaning the pipeline and bypassing the bulk of production flow through the cleaning pig.

Referring now to FIG. 1, cleaning pig 20 is shown within pipeline 22 having flow 24 coming from the left. Cleaning pig 20 is restrained at the rear by a synthetic rope or other wire 26 at an eyelet attachment 28, has a cup type seal 30 which sealingly engages the bore 32 of pipeline 22, and a rotating spinner jet 34 at the front or right end.

In operation actuated cylindrical gate 36 opens or closes windows 40 to maintain a pressure differential, e.g. 200 p.s.i. across the cleaning pig to provide a pressure to feed to rotating spinner jet 34 which cleans the pipeline as is seen by jet flows 42-52. Jet flows 42-46 are at a relatively steep angle to clean closer to the cleaning pig and jet flows 48-52 are at a more shallow angle to clean further down the pipeline. With this multiplicity of jetting blasts spinning around the pipeline wall 32, cleaning of the pipeline is assured.

Flow arrows 54-60 illustrate how the pipeline flow 24 enters the cleaning pig 20 through windows 62 and exit through windows 40 to bypass the majority of the pipeline flow 24 through the cleaning pig 20. In this case the windows 40 and 62 are illustrated to be three windows each at one hundred and twenty degrees.

Figure 2:
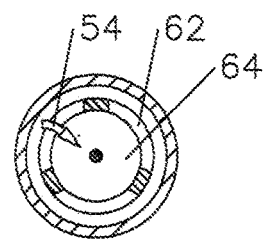
FIG. 2 is a cross section of FIG. 1 taken along lines "2-2" showing the large bypass area through the cleaning pig.

Referring now to FIG. 2 which is a cross section taken along lines "2-2" of FIG. 1, it is seen that the flow 54 coming in the windows 62 has a large area 64 for flow through cleaning pig 20 to insure that there is not a significant pressure flow restriction to the pipeline 22.

Figure 3:
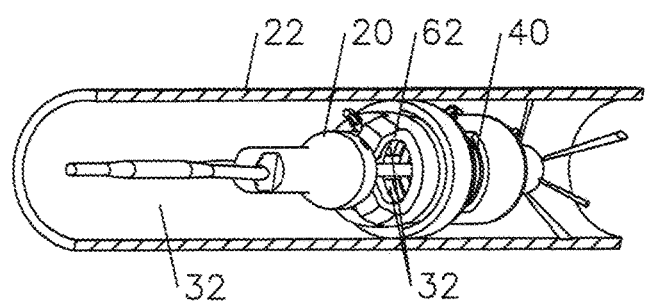
FIG. 3 is a similar view to FIG. 1 but taken at 45° to illustrate that the windows and the internal bypass area in the cleaning pig are so large that you can see through the pig.

Referring now to FIG. 3 which is a similar figure as FIG. 2 which is rotated 45° shows that the flow areas through windows 62 and 40 are so large that you can literally see wall 32 of pipeline 22 through the windows across the pig.

Figure 4:
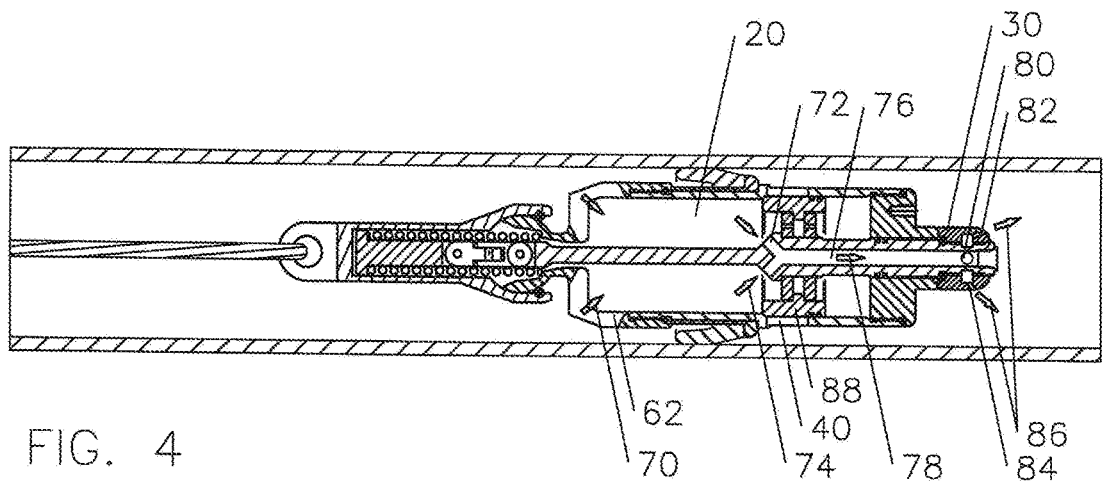
FIG. 4 is a cross section view of the cleaning pig as seen in FIG. 1, but with limited flow which is only going through the jetting nozzles at the front rather than having the bypass areas open.

Referring now to FIG. 4, which shows cleaning pig 20 in the condition such that all the flow within the pipeline is taken through the rotating spinner jet 30 at a low-pressure differential. Flow enters the pig at arrow 70 through window 62, enters port 72 as shown by arrow 74, continues down center bore 76 as shown by arrow 78, exits the center bore 76 by radial ports 80, and then passes through nozzles 82 and 84 to exit as jetting streams 86. Nozzle 82 is at a shallow angle to clean ahead of the cleaning pig 20 and nozzle 84 is at a steeper angle to clean closer to cleaning pig 20. Nozzles 80 and 82 may represent a multiplicity of nozzles spaced around the circumference of rotating spinner jet 30. At this time windows 40 are closed by cylindrical gate 88.

Figure 5:
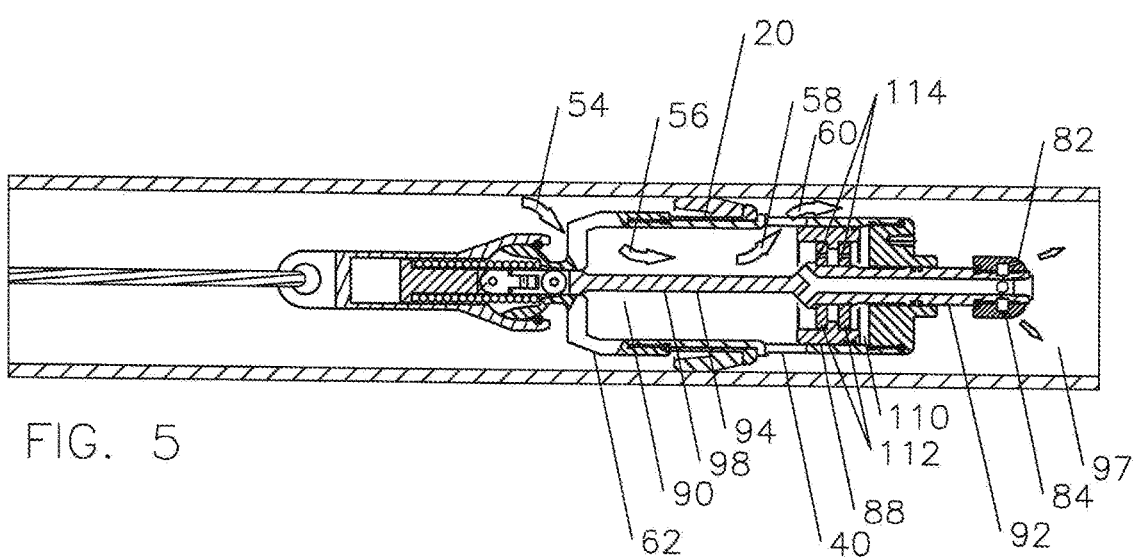
FIG. 5 is a cross section view similar to FIG. 4, except it is shown opened similarly to FIG. 1 with a high flow volume going through the bypass in the center of the pig while still jetting.

Referring now to FIG. 5, cleaning pig 20 is shown when the flow is greater than will pass through the nozzles 82 and 84 and cylindrical gate 88 is pushed open by the pressure within the central cavity 90 of the cleaning pig 20 acting on the diameter 92 of control rod 94. The pressure acting on control rod 94 is pushing towards the right on this figure and is restrained by spring 96. The preload on spring 96 will determine when cylindrical gate 88 will begin to open. Cylindrical gate 88 will then open until the pressure differential between central cavity 90 and the area 97 in front of the pig times the area of diameter 92 of the control rod 94 minus the area of diameter 98 of control rod 94 balances the load on spring 96.

As cylindrical gate 88 working with window 40 provides a large flow area, there is a tendency for the cylindrical gate 88 to open quickly and allow the pressure differential to drop and the cylindrical gate 88 to return to the closed position and repeat the process in a form of hammering. To dampen this activity a dampening chamber 110 is provided and plates 112 are provided with orifice holes 114 to slow the movement of cylindrical gate 84 and allow its movement to stabilize.

Figure 6:
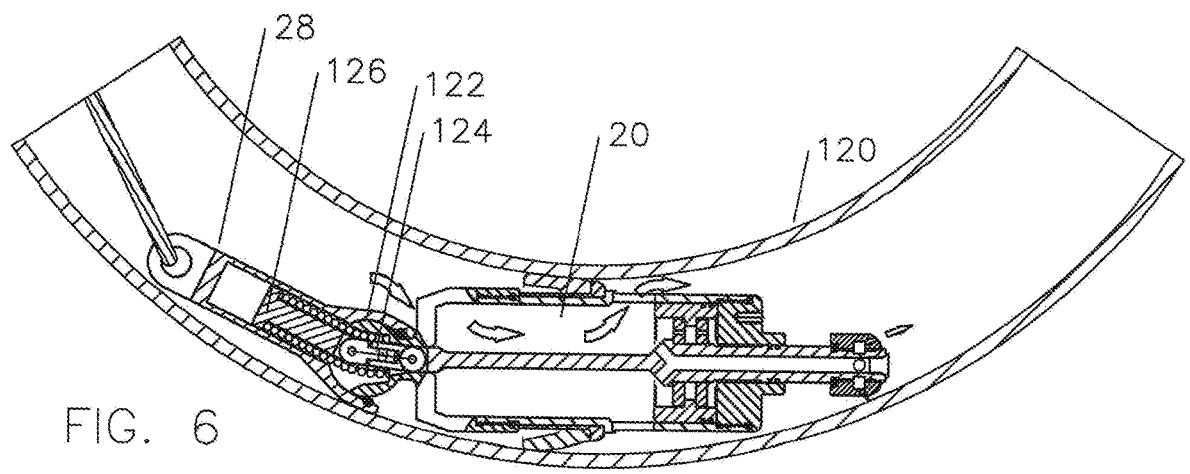
FIG. 6 is a cross section view of the pig of FIG. 5 passing through 3D pipe bend.

Referring now to FIG. 6, cleaning pig 20 is shown moving through a 3D bend 120 or a section of pipe which is bent to a radius three times the diameter of the pipe. Such bends are common in offshore piping and the inability to pass these bends will limit the usefulness of a cleaning pig. In addition to a very compact design, a ball joint 122 is provided on the eyelet attachment 28 and flex joints 124 connect the control rod 94 to the spring piston 126.

Figure 7:
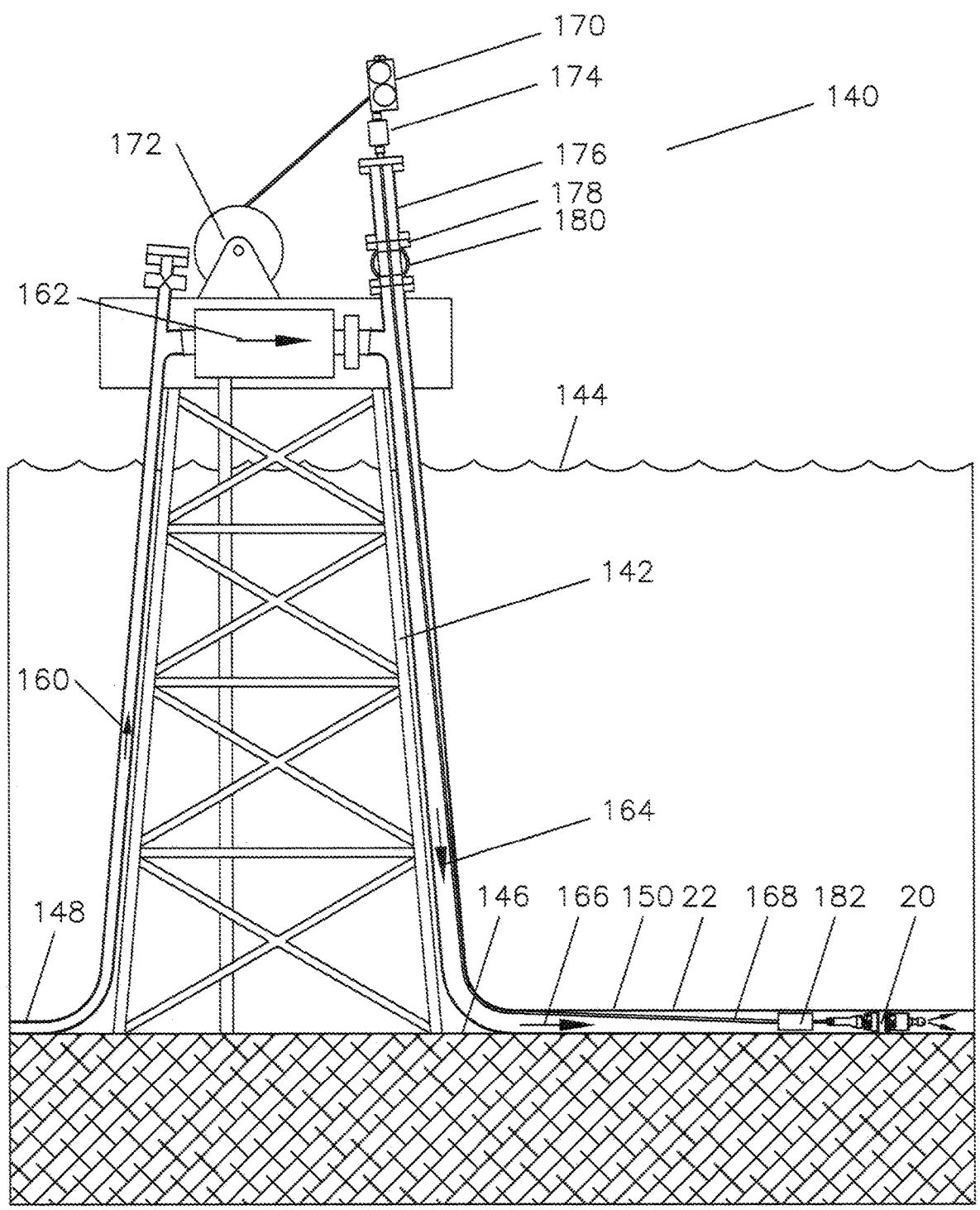
FIG. 7 if a view of a cleaning pig launched from an entrance flange on a platform and cleaning a subsea pipeline.

Referring now to FIG. 7, a view of a system 140 utilizing the present invention is shown with a platform 142, the ocean surface 144, the seafloor 146, an incoming pipeline 148 and an exporting seafloor pipeline 150 which takes the hydrocarbons to a delivery point which is likely the shore.

Arrows 160-166 indicate the flow and direction of the flow within the pipelines. Cleaning pig 20 moves within the flow and is restrained from moving freely in the flow by restraining line 168 which may be a wire, a cable, a synthetic rope or the like. Restraining line 168 goes back to winch 170 which can be of various types of winches, however, a synthetic rope winch such as is shown in U.S. Pat. No. 10,669,138 is particularly beneficial as it can provide a high force with control without the use of a large heavy winch. The synthetic rope and be transported on and used from a light duty spool 172. The synthetic rope is also near neutrally buoyant so while providing a high loading capability, it does not cause a heavy drag load in the pipeline adding to forces and making sensitive control more difficult.

The winch 170 is mounted on one or more strippers 174 to seal on the restraining line 168, which is mounted on spacer spool 176, which is mounted on an entrance connection 178 to the pipeline. Spacer spool 176 allows the cleaning pig 20 to be protectively restrained within its bore while the winch 70 is being lowered onto the entrance connection 178. Pressure control equipment 180 is shown to allow the equipment to be safely landed onto the entrance connection 178 while the pipeline contains pressured flow.

Once the pipeline is cleaned, the cleaning pig 20 is simply pulled back to the same entrance connection 178 and within said spacer spool 176 and removed.

Additionally, pipeline inspection equipment 182 can be connected behind cleaning pig 20 to allow pipeline inspection while the pipeline is being cleaned. Alternately, pipeline cleaning can be done in one trip and then the cleaning pig can be run in another trip to deploy and retrieve the pipeline inspection equipment 120.

In using this method the need to use high cost chemicals is eliminated as the jetting is available to all parts of the pipeline. Further, as you are using the existing flow in the pipelines for move the pig and provide the jetting, the need for acquiring, delivering and using special pumps and pumping fluids is eliminated.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

SEQUENCE LISTING

N/A

That which is claimed is:

1. A method of using flow within a pipeline to clean the inner wall of said pipeline, comprising:
   connecting a cleaning pig to a restraining rope or cable,
   placing said cleaning pig into said pipeline to be cleaned at a first location,
   using said restraining rope or cable to restrain the speed of the cleaning pig as the cleaning pig is pushed by a flow of fluid within said pipeline whereby the restraining causes a pressure differential to occur between an upstream side of said pig and a downstream side of said cleaning pig,
   wherein the pig comprises one of more jetting nozzles,
   using said pressure differential to jet a first portion of said flow within said pipeline through said one or more jetting nozzles to clean said inner wall of said pipeline,
   providing a flow area through said cleaning pig to bypass a second portion of said flow through said cleaning pig, wherein the second portion flows through said flow area and does not pass through said one or more jetting nozzles,
   providing a gate on said flow area, wherein the gate is opened responsive to said pressure differential exceeding a limit, wherein fluid is able to pass through the pig and be jetted by the one or more jetting nozzles while the pressure differential does not exceed said limit and the gate is closed, and
   providing a motion dampening chamber on said pig to dampen movement of the gate.

2. The method of claim 1, wherein said flow area through said cleaning pig is at least 33% of the area within the bore of said pipeline.

3. The method of claim 1, further comprising providing an orifice to control flow into and out of the motion dampening chamber.

4. The method of claim 1, wherein said gate is a cylinder.

5. The method of claim 1, wherein one or more of said one or more jetting nozzles are on a ring capable of rotating and wherein one or more jetting nozzles are skewed relative to the centerline of said cleaning pig.

6. The method of claim 1, wherein a first portion of said one or more jetting nozzles are at a first angle with respect to the centerline of said pipeline which causes the first portion of said one or more nozzles to clean said pipeline at a first distance and a second portion of said one or more jetting nozzles are at a second angle with respect to said centerline of said pipeline which causes the second portion of said one or more nozzles to clean said pipeline at a distance greater than said first distance.

7. The method of claim 1, further comprising returning said cleaning pig to said first location.

8. The method of claim 1, further comprising using said cleaning pig to transport inspection tools into said pipeline.

9. The method of claim 8, further comprising using said cleaning pig to return said inspection tools to said first location.

10. A method of using flow within a pipeline to clean the inner wall of said pipeline, comprising:
   providing a winch,
   providing a restraining rope or cable on said winch,
   connecting a cleaning pig to said restraining rope or cable,
   placing said cleaning pig into said pipeline to be cleaned at a first location,
   using said restraining rope or cable to restrain the speed of the cleaning pig as the cleaning pig is pushed by a flow of fluid within said pipeline whereby the restraining causes a pressure differential to occur between an upstream side of said cleaning pig and a downstream side of said cleaning pig,
   wherein the pig comprises one of more jetting nozzles,
   using a first pressure differential to jet all of a first flow within said pipeline through said one or more jetting nozzles to clean said inner wall of said pipeline at a first pressure, wherein the first pressure differential is not sufficient to open a bypass gate on the pig,
   using a second pressure differential, which is higher than the first pressure differential, to jet a first portion of a second flow within said pipeline through said one or more jetting nozzles to clean said inner wall of said pipeline and using said second pressure differential to open the bypass gate to bypass a second portion of said second flow within said pipeline through a bypass area of said bypass gate, and
   providing a motion dampening chamber on said pig to dampen movement of the bypass gate.

11. The method of claim 10, wherein said flow area of said bypass gate is at least 33% of the area within the bore of said pipeline.

12. The method of claim 10, wherein said bypass gate is cylindrical.

13. The method of claim 10, further comprising providing one or more orifices to restrict flow into and out of said motion dampening chamber.

14. The method of claim 10, wherein one or more of said one or more jetting nozzles are on a ring capable of rotating and wherein one or more jetting nozzles are skewed relative to the centerline of said cleaning pig.

15. The method of claim 10, wherein a first portion of said one or more jetting nozzles are at a first angle which causes the first portion of said one or more nozzles to clean said pipeline at a first distance and a second portion of said one or more jetting nozzles are at a second angle which cause the second portion of said one or more nozzles to clean said pipeline at a distance greater than said first distance.

16. The method of claim 10, further comprising returning said cleaning pig to said first location.

17. The method of claim 16, further comprising said cleaning pig using said one or more jetting nozzles to clean said pipeline as it is returning.

18. The method of claim 10, further comprising using said cleaning pig to transport inspection tools into said pipeline.

19. The method of claim 18, further comprising using said cleaning pig to return said inspection tools to said first location.

* * * * *